Fig. 1.

INVENTOR:
Garland R. Gordon

Fig. 2.

April 2, 1957  G. R. GORDON  2,787,197
SHAPING MACHINE
Filed March 22, 1954  5 Sheets-Sheet 3

Fig. 3.

INVENTOR:
Garland R. Gordon
BY
ATTORNEY

April 2, 1957

G. R. GORDON 2,787,197

SHAPING MACHINE

Filed March 22, 1954

INVENTOR:
Garland R. Gordon
BY
Walter J. Jason
ATTORNEY

April 2, 1957 G. R. GORDON 2,787,197
SHAPING MACHINE
Filed March 22, 1954 5 Sheets-Sheet 5

INVENTOR:
Garland R. Gordon
BY
ATTORNEY

United States Patent Office 2,787,197
Patented Apr. 2, 1957

2,787,197

SHAPING MACHINE

Garland R. Gordon, Fort Worth, Tex., assignor, by mesne assignments, to General Dynamics Corporation, a corporation of Delaware Application March 22, 1954, Serial No. 417,704

10 Claims. (Cl. 90—13)

The invention relates generally to shaping machines and more particularly to an improved form of shaper for milling variable angles on form blocks or other workpieces.

As is known, form blocks for working sheet metal, as in hydro-press or stretch forming operations, frequently have face angles which are other than 90° with respect to the surface of said form block. Such face angles may be constant the length of the form block, or may vary along the length of the form block from an open angle, that is an angle of less than 90° down from the surface, to a closed angle, that is an angle more than 90° down from the surface. It is apparent that a form block may have any combination of varying or changing face angles.

Heretofore, the shaping of variable face angles on form blocks by conventional tilting shapers has required "step-machining" methods, which involve phasing of the cuts by alternately stopping and starting of the cutting operation for each adjustment for angular variation, and final finish by hand filing. Since the center of tilt on a conventional tilting shaper is the intersection of the table top and the centerline of the cutter, any change in the angle of tilt will raise or lower the end of the cutter. Therefore, each time the angle of tilt is changed, it becomes necessary to raise or lower the cutter, since the top of the cutter must always be at the top of the form block. It is evident that this is a time consuming procedure. It is not uncommon to have jobs which require as many as 25 or 30 changes in the angle of tilt of the cutter; this will necessitate stopping the machine that number of times and manually adjusting the position of the cutter each time. It should be readily apparent that for each change in angle there is a step or jog where the machine was stopped and the angle of tilt changed. After this "step machining" operation, a final finish by hand filing is necessary to remove these steps or jogs. It has been found that the major portion of the work in shaping of a form block lies in "blending" into a smooth continuous surface those steps or jogs cut by the shaper on the face of the block.

The shaper of the present invention is adapted to mill the edge faces of form blocks into varying face angles, blending such face angles imperceptibly without stopping the machine to thereby achieve an accurate contour and a continuous surface. The change from one face angle to another will be automatic whereby the necessity for stopping the machine to change the cutter angle or otherwise reposition the cutter is substantially eliminated.

The center of tilt of the cutter of the present shaper differs from that of conventional shaper machines in that it is located at the upper front edge or corner of the milling cutter, instead of at the conventional intersection of table top and centerline of cutter. This center of tilt or point of rotation is vertically adjustable for a given distance above the table top to accommodate form blocks or workpieces of different thicknesses, as will be apparent. With the point of rotation lying at the upper forward edge of the cutter, it should be readily apparent that when the top of the cutter is flush with the top of the form block, the point of rotation coincides with the upper corner of the edge face of the form block. Furthermore, since this point on the cutter remains at the same height above the table top through all angles of tilt of the cutter, it is unnecessary to raise or lower the cutter as the angle of tilt changes.

Accordingly, the primary object of the present invention is to provide a means for gradually and continuously varying the angle of tilt of a cutting tool during the shaping of face angles on a work piece.

Another object of the invention is to provide a means for substantially eliminating handwork or blending in the production of a continuous contour on form blocks having a varying face angle.

A further object of the invention is to provide a means for automatically controlling the angle of tilt of the cutting tool whereby a form block may be automatically shaped to a finished contour without having to manually vary the angle of tilt.

Still another object of the invention is to provide a shaping machine having an improved construction adapted for automatic continuous cutting operations and wherein adjustments are maintained at a minimum.

A still further object of the invention is to provide an improved shaping machine having the center of tilt of its cutting tool located as a fixed point, vertically adjustable within limits, at the upper forward edge of the cutting tool, whereby raising and lowering of the cutting tool during work on an individual form block is not required.

Still another object of the invention is to provide in a shaping machine of the character above described, an adjustable means for accommodating cutting tools of various diameters, while maintaining the center of rotation at a vertically adjustable fixed point.

Other objects and features of the present invention will be readily apparent to those skilled in the art from the following specification and appended drawings wherein is illustrated a preferred form of the invention, and in which.

Figure 1:
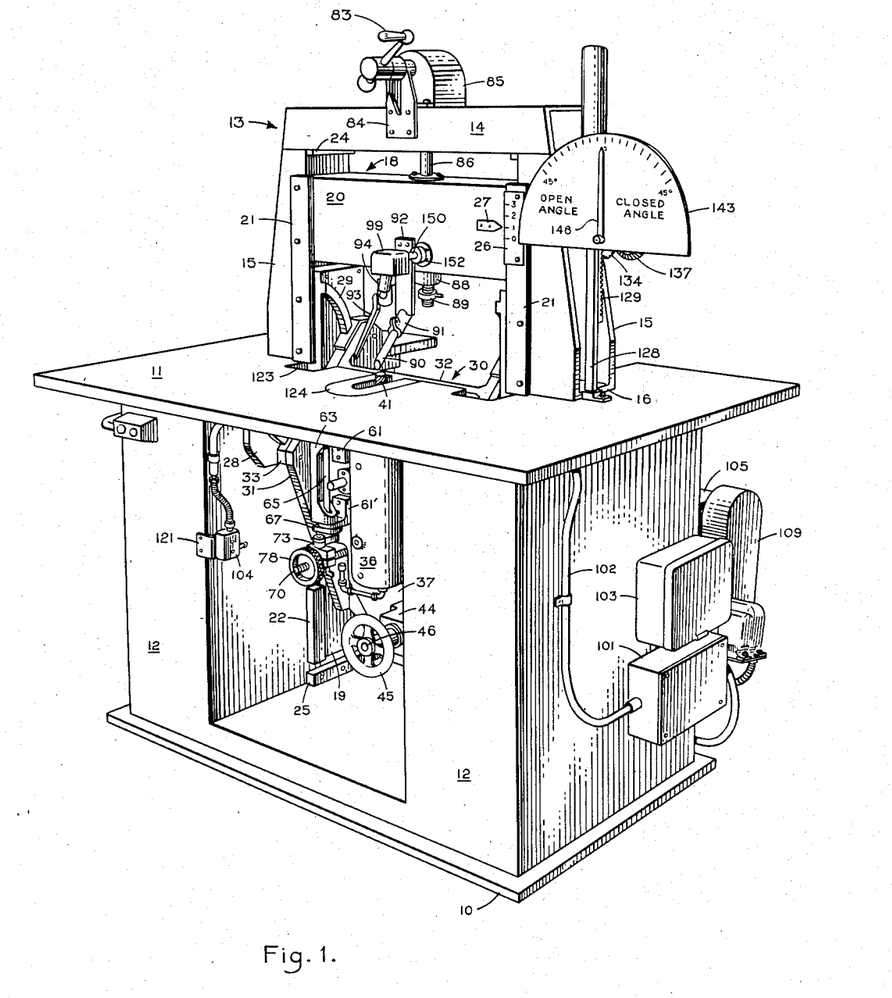
Figure 1 is a perspective view of a shaping machine according to the present invention.

Referring now to Figure 1 of the drawings, the shaping machine of the present invention comprises a base 10 and shaper table 11, the table 11 being conventionally supported at each of its ends by a box-like supporting structure or column 12. Positioned above the shaper table 11 is a superstructure 13 which is formed of a rectangular box-like structure 14, supported spaced above shaper table 11 at each end by a vertical channel-shaped column or support member 15 having a base 16 which is fixedly attached to the upper surface of the shaper table 11. The upper ends of columns 15 are closed as at 17 to provide for attachment of the rectangular structure 14 thereto. The superstructure 13 is thus rigidly secured to the shaper table 11. The inner surfaces of the vertical support members 15 are substantially flush with the inner surfaces of the table supporting columns 12 to accommodate a frame assembly 18 for vertical slidable movement within the space defined by columns 12 and 15. Frame assembly 18 comprises two vertical side plates 19, separated at their upper ends by a horizontal rectangular box-like structure 20. The vertical sliding frame assembly 18 is substantially the same depth as columns 15, and is restrained at its upper end from any movement other than vertical by guide plates 21 fixedly attached to the front and rear faces of columns 15. Frame assembly 18 is similarly restrained from any motion other than vertical at its lower end by angle-shaped brackets 22 fixedly attached to the inner surfaces of the table supporting columns 12. Brackets 22 are adapted to make with recesses 23 (Figures 2 and 4) located in the lower end of the side plates 19 of the vertical sliding frame assembly 18, and, in effect, serve to provide a set of vertically slidable ways.

Blocks 24 which are fixedly attached to the superstructure 13 at the intersection of the rectangular structure 14 and support members 15 serve to act as upper limiting stop means for the vertical sliding frame assembly 18. Similarly, blocks 25, fixedly attached to the inner surfaces of the table supporting columns 12 at the intersection of said columns 12 and the base 10 serve to act as lower limiting stop means for the vertical sliding frame assembly 18. A graduated scale 26 is fixedly attached to one of the front guide plates 21, while a pointer 27 is fixedly attached to the rectangular box-like structure 20, to indicate the vertical position of the sliding frame assembly 18 with respect to the upper surface of the shaper table 11, as will be hereinafter further explained.

Figure 4:
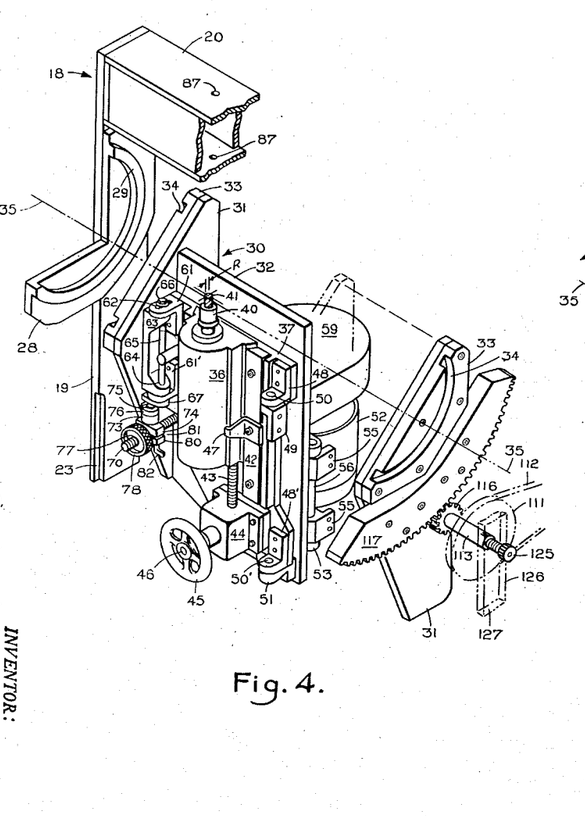
Figure 4 is an exploded perspective view of the tilting frame assembly upon which the spindle and spindle motor are mounted, together with related components, and also illustrates the relationship between the center of the cutting tool and the center of tilt.

Rigidly attached to the inner surfaces of the vertical side plates 19 of frame assembly 18 are a pair of quasi-L-shaped plates 28 (as best shown in Figure 4), having annulated outwardly depending bearings 29 integrally formed therewith. Bearings 29 serve to support and provide a guide for rotation of a tilting frame assembly 30 which is suspended between the side plates 19 of the vertical sliding frame assembly 18. The tilting frame assembly 30 comprises a pair of upright and parallel side plates 31 which are secured at right angles to a vertically disposed center plate 32. For tiltable mounting of side plates 31 there is provided a pair of bearing plates 33 which are fixedly attached to the upper outer surfaces of side plates 31 and which embody arcuately shaped grooves 34 which are adapted to engage with the annulated bearings 29 on plates 28, as best seen in Figure 4.

It is apparent, therefore, that tilting frame assembly 30, is both vertically adjustable and pivotable about a horizontal axis 35 which passes through the geometric centers of the annulated bearings 29 which centers are common to the circular grooves 34 in bearing plates 33. The center of tilt heretofore referred to lies along the axis 35, as will be seen. Thus, axis 35 is vertically adjustable with respect to the upper surface of the shaper table 11 since tilting frame assembly 30 is rotatably mounted on vertical sliding frame assembly 18, which is itself vertically adjustable as heretofore mentioned. However, with relation to tilting frame assembly 30 and sliding frame assembly 18, pivotal axis 35 is fixed.

Figure 2:
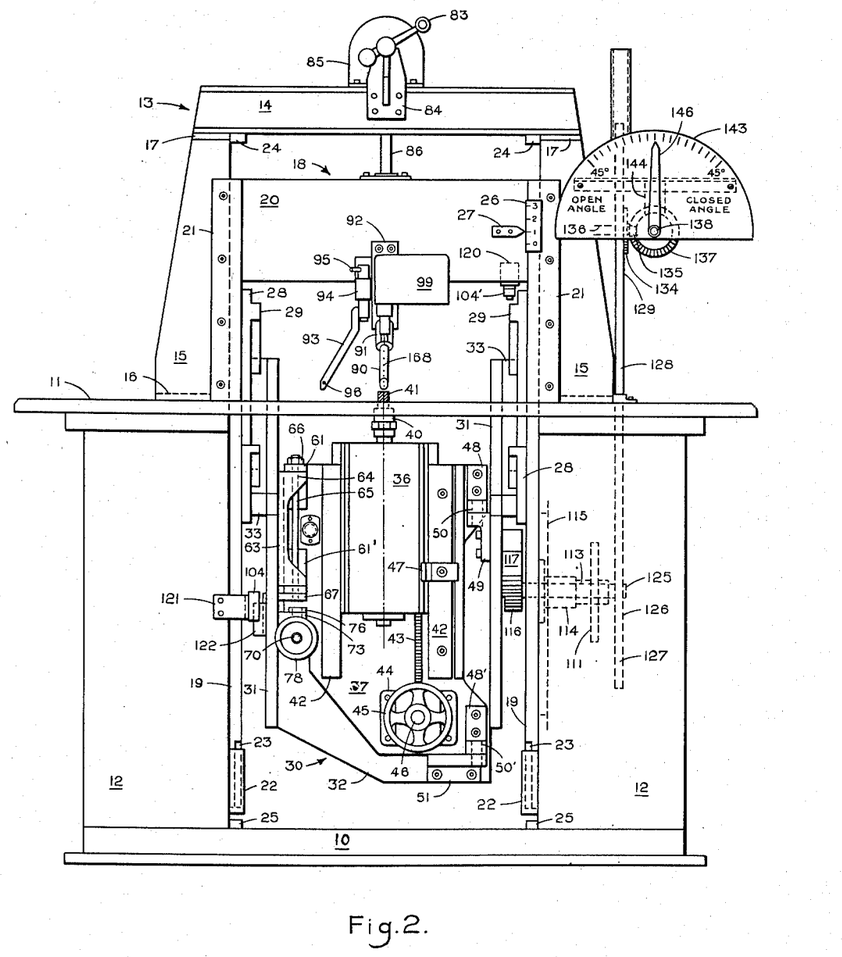
Figure 2 is a front elevational view of the machine shown in Figure 1.
Figure 3:
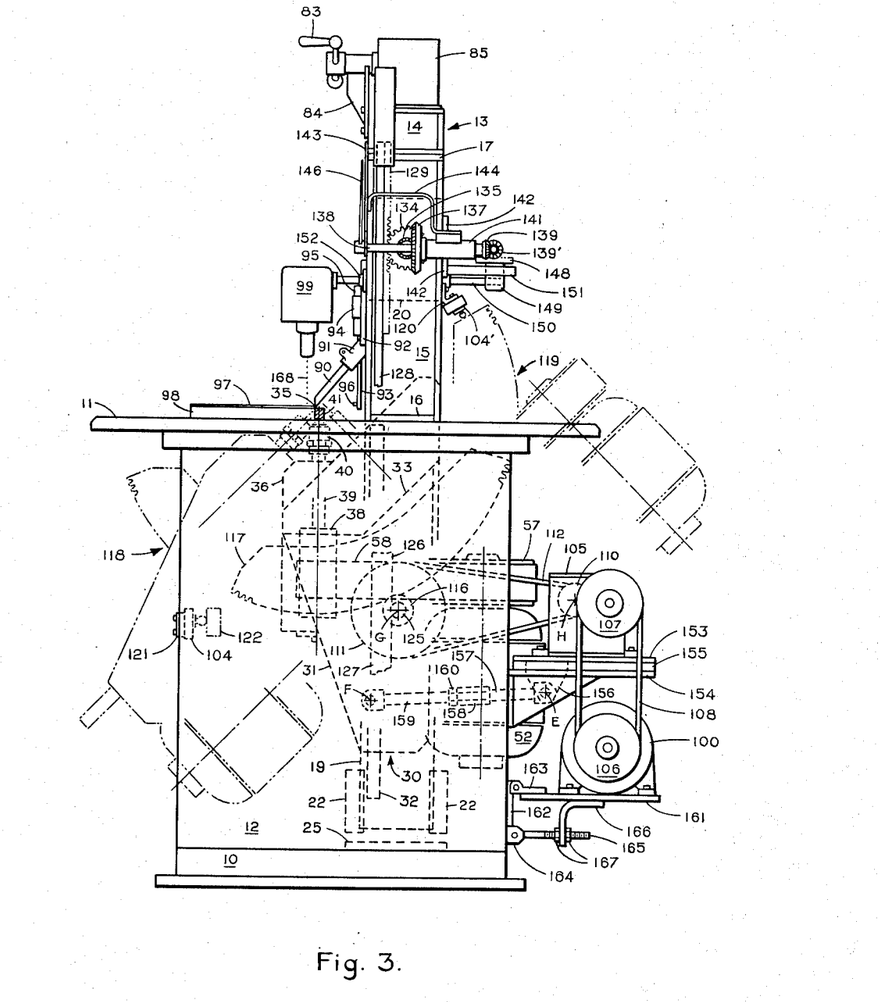
Figure 3 is a side elevational view of the present shaping machine.
Figure 6:
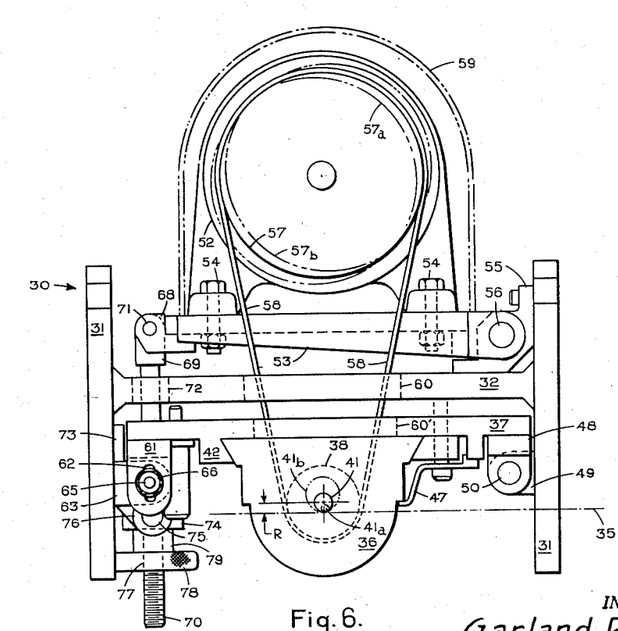
Figure 6 is a detailed plan view of the tilting frame assembly showing the provisions for adjustment of the spindle and spindle motor to accommodate various diameter cutting tools while maintaining the center of tilt tangent to the upper periphery of the cutter as shown.

A spindle housing 36 is mounted on a hinged vertical plate 37 for vertical slidable movement, as best illustrated in Figures 3, 4, and 6, plate 37 being pivotally carried by tilting frame assembly 30. Spindle housing 36 encases a spindle pulley 38 and a conventionally mounted spindle 39 (Figure 3). In addition, a chuck 40 is attached to the upper end of spindle 39 to retain a cutting or milling tool 41 in a usual manner. Spindle housing 36 is mounted in a conventional set of vertical ways 42, which are carried by hinged vertical plate 37. Vertical adjustment of the spindle housing 36 is effected by operative engagement of the upper end of an externally threaded vertical shaft 43, Figure 2, with an internally threaded aperture (not shown) in the body of said spindle housing 36. The lower end of shaft 43 is attached to a bevel gear (not shown) encased in a gear box 44 which in turn is mounted to hinged plate 37. This bevel gear is adapted to cooperate with a similar bevel gear (not shown), which is driven by rotation of a horizontal shaft 46 which is provided at its outer end with a handwheel 45. That is, rotation of handwheel 45 will cause the threaded shaft 43 to rotate thereby resulting in the raising or lowering of spindle housing 36. A clamp 47 mounted on one of the vertical ways 42 serves to lock the spindle housing 36 in position after vertical adjustment has been made. In this manner, housing 36 is adapted for vertical movement in order to accommodate cutters 41 of various lengths.

Hinged vertical plate 37 is pivotally fastened to the tilting frame assembly 30 to provide adjustment of the position of spindle housing 36 to accommodate milling cutters 41 of various diameters, as will be hereinafter explained. A pair of angle brackets 48 and 48' are fixedly attached to the face of hinged plate 37 at the upper and lower corners, and a similar angle bracket 49 is mounted on the inner face of the vertical side plate 31 to serve as support and pivotal means for angle bracket 48, brackets 48 and 49 being connected by pivot pin 50. Another bracket fitting 51 is mounted on the front face of the vertical center plate 32 of the tilting frame assembly 30, which correspondingly serves as support and pivotal means for angle bracket 48', brackets 48' and 51 being connected by pivotal pin 50'.

The spindle driving motor 52 is pivotally mounted on the rear face of the tilting frame assembly 30, as best shown in Figure 6. Motor 52 is fixedly attached to a hinged frame 53, as by bolts 54, frame 53 in turn being supported by brackets 55 and pivotable about a hinge pin 56 which passes through the end of frame 53 and brackets 55. Brackets 55 are securely mounted between the rear face of the vertical center plate 32 and the inner face of the vertical side plate 31 of the tilting frame assembly 30, as shown in Figure 6. The spindle driving motor pulley 57 is connected to the spindle pulley 38 by a driving belt 58 in a conventional manner, the motor pulley 57 being enclosed by a guard 59. The vertical center plate 32 of the tilting frame assembly 30 and the hinged vertical plate 37 are centrally apertured, as at 60 and 60', respectively to permit passage of the driving belt 58 therethrough. Spindle driving motor 52 is mounted for pivotal adjustment, as described, to insure proper tension in the driving belt 58.

The means employed for locking the hinged plate 37, after fore or aft adjustment has been made for a selected milling cutter 41, is best illustrated in Figures 4 and 6. Angle brackets 61 and 61' are fixedly attached to the face of hinged plate 37, opposite the pivot pins 50 and 50', such as by bolts or cap screws. The upper bracket 61 is preferably mounted flush with the upper left-hand corner of hinged plate 37 and has its vertical flange downwardly disposed, while the lower bracket 61' is mounted directly below and in alignment with bracket 61, but has its vertical flange upwardly disposed. The outwardly extending flanges of angle brackets 61 and 61' are each provided with an elongated aperture 62 and embrace a fitting 63 which is securely mounted on the inner face of the vertical side plate 31 of the tilting frame assembly 30. The fitting 63 is provided with an aperture 64 in its upper and lower ends, which apertures are aligned with elongated holes 62 of brackets 61 and 61'. A cylindrical rod 65, externally threaded at its upper end and adapted to receive a nut 66, has fixedly attached to its lower end, such as by welding, a flat plate 67. Rod 65 is adapted to pass through apertures 64 and elongated holes 62, so that the upper surface of plate 67 abuts against the lower surface of the outwardly extending flange of angle bracket 61'. The upper threaded end of rod 65 extends sufficiently above the upper surface of the outwardly extending flange of angle bracket 61 to accommodate a washer and nut 66. Flat plate 67, at the lower end of rod 65, has a squared-off end abutting against the inner face of vertical side plate 31, which serves to restrain rod 65 from rotating and permits nut 66 to be tightened on rod 65. Rod 65 is retained in a vertically disposed position by apertures 64 in fitting 63. The elongated holes 62 in the outwardly extending flanges of angle brackets 61 and 61' serve to permit pivotal movement of hinged plate 37 within limits, to the extent that the ends of elongated holes 62 abut against rod 65, only when nut 66 is in a loosened position. When nut 66 is tightened on rod 65, the assembly is clamped together and hinged plate 37 is secured against any further pivotal movement.

After the hinged plate 37 is locked in the desired position, the hinged frame 53 supporting the spindle drive motor 52 is adjusted fore or aft to properly tension the drive belt 58. A bifurcated fitting 68 is fixedly attached to the hinged frame 53 at the end opposite its pivoted end. The bifurcated fitting 68 is adapted to embrace a clevis 69 secured to the aft end of a forwardly extending horizontally disposed cylindrical shaft 70, being pivotally attached thereto with pin 71. The vertical center plate 32 of the tilting frame assembly 30 is apertured at 72 to permit passage of shaft 70 therethrough. A support fitting 73 is mounted on the inner face of the vertical side plate 31 to assist in the pivotal support of the adjustment mechanism at the forward end of cylindrical shaft 70. A rectangular block 74 having a downwardly disposed semi-cylindrical recess therethrough in a fore and aft direction (not shown) and an upwardly extending vertically disposed cylindrical protuberance 75 integrally formed therewith, is positioned directly below the support fitting 73. Protuberance 75 is adapted to extend through a vertically disposed circular aperture in support fitting 73, being retained by ring 76. The forward end of cylindrical shaft 70 is externally threaded to engage an internally threaded centrally disposed aperture 77 in handwheel 78. Handwheel 78 has integrally formed therewith a rearwardly extending cylindrical portion 79 (Figure 6). A rectangular block 80 (Figure 4), similar to rectangular block 74, having an upwardly disposed semi-cylindrical recess therethrough in a fore and aft direction (not shown) is adapted to consociate with block 74 upon assembly, and is suitably fastened thereto at one end. The semi-cylindrical recesses of blocks 74 and 80 are of a size suitable to rotatably rest within a cylindrical shouldered recess provided near the inner end of cylindrical portion 79 whereby handwheel 78 is rotatable. Cylindrical portion 79 serves as a spacer between handwheel 78 and blocks 74 and 80 and is suitably rotatably connected to blocks 74 and 80 as described to restrain handwheel 78 from any fore and aft motion.

Rectangular blocks 74 and 80 are also adapted to serve as a braking device to lock handwheel 78 against inadvertent rotation. Blocks 74 and 80 are positioned about the described cylindrical shouldered recess in cylindrical portion 79 with a gap or space 81 therebetween, and are adapted to be moved toward one another into clamping engagement with the recess in cylindrical portion 79 by a lockscrew 82 which passes through the unfastened end of block 80 and into an internally threaded aperture in block 74. Lockscrew 82 thus serves as a means for frictionally braking handwheel 78 to restrain it in a locked position against rotational movement. With lockscrew 82 in its unlocked position, fore or aft adjustment of hinged frame 53 is effected by rotation of handwheel 78, causing externally threaded cylindrical shaft 70 to move fore or aft by engagement with the internally threaded aperture 77 in handwheel 78 thereby pivoting hinged frame 53 about pivotal hinge pin 56 and properly tensioning the drive belt 58.

Since the locus of pivotal pin 71 describes an arc about pivotal hinge pin 56 in fore and aft adjustments, the angularity of cylindrical shaft 70 varies slightly with respect to the vertical side plate 31 of the tilting frame assembly 30, and pivotal movement of handwheel 78 occurs. It is to permit this movement that the pivotal action of cylindrical protuberance 75 within support fitting 73 is provided for handwheel 78.

Vertical sliding frame assembly 18 is vertically adjustable by means of a handcrank 83, Figures 1, 2 and 3. A support bracket 84 is fixedly attached to the face of the rectangular box-like structure 14, and serves to support a horizontally disposed shaft (not shown), which shaft rigidly carries handcrank 83 at its forward end. A usual bevel gear (not shown) which is enclosed by gear box 85 is keyed to the aft end of the horizontally disposed shaft, and a suitably supported mating bevel gear (not shown) is pinned to the upper end of a vertically disposed lift screw or shaft 86 whereby rotation of handcrank 83 causes rotation of shaft 86.

Shaft 86 passes through the centers of rectangular box-like structures 14 and 20, as at 87, Figure 4, and has its lower end externally threaded to accommodate a flanged and internally threaded collar 88, which is fixedly attached to the lower surface of the rectangular box-like structure 20, and an internally threaded locking ring 89 below collar 88.

Collar 88 serves to lock the sliding frame assembly 18 in vertical adjustment by tightening said locking ring 89 against the underside of collar 88 to restrain shaft 86 from rotating. When handcrank 83 is turned to raise or lower the sliding frame assembly 18, the shaft or lift screw 86 is rotated by the bevel gear system enclosed by gear box 85. By engagement of the threads of shaft 86 and collar 88, the rectangular box-like structure 20, and consequently the vertical sliding frame assembly 18, is either raised or lowered.

A cylindrical angularly disposed guide pin 90 is adjustably mounted in a support fitting 91, which in turn is suspended from the face of the rectangular box-like structure 20 by plate 92, plate 92 being fixedly attached to structure 20, such as with bolts or cap screws. A gauge bar 93 is rotatably mounted in a support bracket 94, which in turn is also fixedly attached to the face of the rectangular box-like structure 20. Gauge bar 93 serves to provide alignment means for guide pin 90. A locking ring 95 (Figure 2), similar to locking ring 89 heretofore described, is located at the upper end of support bracket 94, and serves to lock the gauge bar 93 in position when in use, or to one side when not in use. A cylindrical gauge pin 96 is located near the lower end of the gauge bar 93, such that when gauge bar 93 is in position for aligning guide pin 90, the gauge pin 96 is substantially parallel to the pivotal axis 35, its inner edge lying directly above said pivotal axis 35. The lower end of guide pin 90 is beveled in such a manner that the beveled face lies essentially in a vertical plane. To align the guide pin 90, the gauge bar 93 is positioned as aforementioned, with the side of said gauge bar 93 abutting against the side of the guide pin 90, and locked in place with locking ring 95. The guide pin 90 is then lowered until its vertically beveled face contacts the inner surface of the cylindrical gauge pin 96. The gauge bar 93 is then unlocked and swung out of aligning position to one side. In this manner, the guide pin 90 is in aligned (operating) position, the vertically beveled face of said guide pin 90 being co-planar with a vertical plane passing through the pivotal axis 35, and the lowermost point of said guide pin 90 being tangent to said pivotal axis 35. The guide pin 90 is preferably mounted in support fitting 91 in a keyed relationship, so that guide pin 90 is slidably adjustable, but not rotatable, and in this manner, the beveled face of said guide pin 90 is maintained in a vertical plane.

In operation, the guide pin 90 has a dual function. It is intended primarily to serve as a contouring guide for a template 97 mounted on a workpiece such as a form block 98 to be machined. The guide pin 90 is further employed as an alignment means to properly locate or position the cutter 41. Since an inherent design feature of the present invention is to have the upper front edge of the cutter 41 tangent to the pivotal axis 35, means must be employed to insure accurate adjustment of cutter 41. This is necessary since the center of tilt or rotation of cutter 41, which is the upper forward edge of the cutter 41, remains at the same height above the upper surface of the shaper table 11 through the full 90° of movement of cutter 41. The lowermost point of the guide pin 90 approximately coincides with the upper forward edge of the cutter 41, there being, for practical machining purposes, a slight clearance between the guide pin 90 and cutter 41.

In setting up the machine for a cutting operation to accommodate a desired length of cutter 41, the spindle housing 36 is raised until the upper surface of the cutter 41 lies substantially in the same horizontal plane as the lowermost point of guide pin 90, that same plane also including pivotal axis 35; housing 36 is then locked in position by means of clamp 47. The spindle housing 36 is also pivotally adjustable in a fore and aft direction, as aforementioned, to accommodate cutters 41 of varying diameters. Thus, to accept the diameter of a particular cutter 41 the hinged plate 37 is swung fore or aft, thereby pivoting the spindle housing 36 until the front face of the cutter 41 is tangent to a vertical plane passing through the beveled end of guide pin 90, that same vertical plane also including pivotal axis 35. The hinged plate 37 is then locked in position by tightening nut 66 as heretofore described. The spindle driving motor 52 must now be adjusted fore or aft to properly tension drive belt 58 after which the hinged frame 53 is locked in position by tightening lockscrew 82. The relationships between the milling cutter 41 and the pivotal axis 35, and between the spindle housing 36 and the spindle driving motor 52 (or the cutter 41 and the motor pulley 57), are most clearly illustrated in Figure 6. Dimension "R" (also shown in Figure 4) is the distance from the center of the cutter 41 to the pivotal axis 35, where $2R=D=$ diameter of the cutter 41.

To illustrate the adaptability of the present machine to accommodate cutters of various diameters, there is shown in Figure 6, in addition to cutter 41, a smaller diameter cutter 41a (in dash outline) and a larger diameter cutter 41b (in dash-dot outline). It is noted that cutter 41 and cutters 41a and 41b all lie tangent to pivotal axis 35, this relationship of the cutters to pivotal axis 35 being effected through appropriate fore and aft pivotal adjustments of spindle housing 36.

The pivotal adjustment of spindle housing 36 to accommodate various cutter diameters will necessitate a relocation of the spindle drive motor 52 to maintain proper tension in the driving belt 58. Thus, when a cutter 41a of smaller diameter than cutter 41 is employed, the location of the motor pulley will be as indicated at 57a, and when a larger diameter cutter 41b is employed, the location of the motor pulley will be as shown at 57b.

Figure 5:
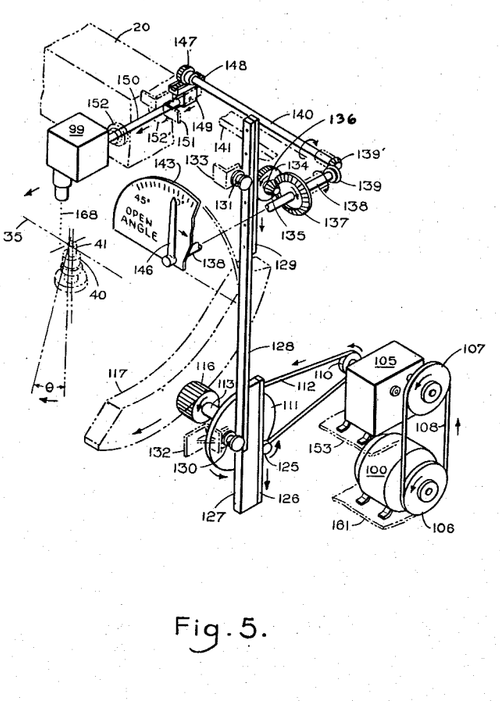
Figure 5 is a perspective of the schematic arrangement of the gearing and driving system embodied in the automatic control mechanism of the present invention.

The means for controlling and varying the angle or degree of tilt of the milling cutter 41 are adapted for automatic operation, and comprise an electronic tracing device 99 linked to the tilting frame assembly 30 by means of a system of gears, as schematically illustrated in Figure 5. An electro-mechanical or electrical device, as will be hereinafter described, may also be employed to automatically vary the angle of tilt, but the preferred form of the invention resides in the employment of the electronic tracing device 99.

In operation, the electronic tracing device 99 transmits an electrical impulse of a given nature (the origin of this impulse and its magnitude being hereinafter described) to a tilt control motor 100, which preferably is a 3-phase motor capable of actuation in either a clockwise or a counterclockwise direction, depending upon the nature of the electrical impulse. This actuation of the tilt control motor 100, through a system of belt and gear drives to be described, causes the tilting frame assembly 30 to pivot, thereby changing the angle of tilt of the cutter 41. Simultaneously, the gear system moves the electronic tracing device 99 in a fore or aft direction. The entire system remains in operation until electrical impulses or signals are no longer transmitted from the electronic tracing device 99 to the tilt control motor 100, at which time the tilting frame assembly 30 ceases to move and remains in a stationary position, as will be hereinafter described. The same driving means and system of gears shown in Figure 5 can be employed with an electro-mechanical or other type tracing mechanism in lieu of an electronic tracing device 99.

The electrical impulse or signal generated by the electronic tracing device 99 is first transmitted to a usual amplifying unit 101 through a conduit 102 (Figure 1), mounted on the side of column 12. From the amplifying unit 101 the current is passed to a reversing switch 103 mounted above amplifying unit 101 on column 12. It is understood that the particular construction of reversing switch 103 forms no part of the present invention. Reversing switch 103, therefore, is of conventional construction, comprising the usual circuitry and structure necessary for the actuation, in forward or reverse directions, of a motor, the direction of rotation, as is usual, being dependent upon the electrical signal or impulse which is received by it. Thus, in accordance with the impulse or signal generated by tracing device 99, tilt control motor 100 will rotate in either a clockwise or a counterclockwise direction under the control of reversing switch 103. Electrically associated with tilt control motor 100 are a pair of suitable, normally closed limit switches 104 and 104', located as best illustrated in Figure 3, whose function is to limit the amount of pivotal movement of tilting frame assembly 30 in either direction. Switches 104 and 104' are adapted to be engaged by tilting frame assembly 30 and thereby be operated to open the circuit to tilt control motor 100 to halt the operation of motor 100 and thereby also halt movement of tilting frame assembly 30.

To effect pivotal movement of the tilting frame assembly 30 at a rate which is mechanically practical for effective operation, conventional gear induction means and apparatus are afforded whereby the comparatively high speed of rotation of tilt control motor is converted to a much slower speed. Thus, as seen in Figures 3 and 5, tilt control motor 100 is connected to a reducer device 105 by means of a driving pulley or sheave 106 which serves to rotate a driven pulley 107 on the reducer 105 through the medium of a driving belt 108, pulleys 106 and 107 and belt 108 being suitably covered by a metal guard 109 (Figure 1). The speed of rotation of driven pulley 107 is suitably reduced by the gear system (not shown) of reducer 105 and transmitted to a sprocket 110 rotatably carried by reducer 105. Sprocket 110 serves as a driving means to rotate a driven sprocket 111 through the medium of a drive chain 112 which passes through a vertically slotted aperture in the rear face of column 12. The driven sprocket 111 is keyed to a horizontally disposed cylindrical shaft 113 which is disposed substantially parallel to the pivotal axis 35. Shaft 113, which extends through the vertical side plate 19 into the sliding frame assembly 18, is rotatably supported by a bearing or journal box 114 (Figure 2), the flanges of which are fixedly attached to the outer surface of the right-hand vertical side plate 19 of the vertical sliding frame assembly 18. The inner side plate of the box-like column 12 is apertured at 115 to provide clearance for the journal box 114 when the vertical sliding frame assembly 18 is raised or lowered.

A spur gear 116 is fixedly attached to the left-hand end (as viewed in Figures 4 and 5) of the cylindrical shaft 113, being keyed or pinned thereto in a conventional manner. The external radial teeth of spur gear 116 are adapted to engage mating external radial teeth of a gear segment 117, which is of substantially heavy construction, and which serves to drive tilting frame assembly 30. Gear segment 117, whose geometric center lies on the pivotal axis 35, is fixedly attached to the outer surface of the right-hand vertical side plate 31 of the tilting frame assembly 30, directly below bearing plate 33, such as with bolts or cap screws, the heads of which are flush with or below its outer surface.

The system of gears and driving means which has just been described provides an efficient means for effecting desired pivotal clockwise or counterclockwise movement of the tilting frame assembly 30. With the various elements of the system turning in the directions as indicated by the arrows in Figure 5 it is apparent that a pivotal clockwise movement of tilting frame assembly 30 will be achieved. Conversely, reversing the direction of movement of tilt control motor 100 and the associated gear and drive system will result in the tilting frame assembly 30 turning in reverse or counterclockwise direction.

It has been found that for practical and efficient operation of the present invention a rate of pivotal movement of approximately one degree per second for the tilting frame assembly 30 is preferred. The above described gear and drive system affords an effective means for achieving this rate of turn for it is a simple matter to select pulley sizes and gear ratios which will convert the relatively high speed of the tilt control motor (which usually is of the order of 1800 R. P. M.) into the desired rate of movement of the tilting frame assembly 30. The purpose of the remainder of the gear and drive system of Figure 5, as will be fully described and discussed hereinafter, is to control the movement of the electronic tracing device 99, and further, to indicate to the machine operator the angle of tilt of the tilting frame assembly 30.

The operational limits of angular tilt of the tilting frame assembly 30 to each side of the vertical, or neutral position, is illustrated in Figure 3, wherein the maximum forward position of the tilting frame assembly is indicated at 118 and the maximum aft position is indicated at 119. In practice, it has been found, that a movement of 45° in either direction from the neutral position is desirable for efficient use of the present machine, and the construction herein illustrated permits such desired movement. As heretofore mentioned, two normally closed limit switches 104 and 104' serve to limit the pivotal movement of the tilting frame assembly 30 in either direction, which will here be assumed to be a movement of 45° in either direction. Aft limit switch 104' is mounted on the rear face of the rectangular box-like structure 29 of the vertical sliding frame assembly 18 by a bracket 120, and in a position so that when the tilting frame assembly 30 reaches the 45° aft position 119, the upper end of gear segment 117 contacts limit switch 104' actuating it and opening the circuit to tilt control motor 100 thereby stopping it. Since limit switch 104' is mounted on the vertical sliding frame assembly 18, its relationship to the gear segment 117 remains constant throughout any vertical adjustment of the tilting frame assembly 30 via the sliding frame assembly 18. Front limit switch 104 is mounted on the front face of the left-hand box-like column 12 by means of a bracket 121. To effect actuation of front limit switch 104 there is provided an angularly disposed angle bracket or clip 122 which is fixedly attached to the outer surface of the left-hand vertical side plate 31 of the tilting frame assembly 30. The positioning of bracket 122 is such that when the tilting frame assembly 30 reaches the maximum forward position 118 the face of angle bracket 122 contacts limit switch 104 and opens the circuit to the tilt control motor 100 to halt it. In engaged position with limit switch 104 bracket 122 will be substantially vertically disposed as shown in Figure 3. Since limit switch 104 is stationary, while bracket 122 is vertically movable relative thereto by reason of its support on the tilting frame assembly 30, the bracket 122 is made of sufficient length to insure that it will contact limit switch 104 at any vertically adjusted position of tilting frame assembly 30.

In order to permit movements of tilting frame assembly 30 to its maximum forward and rearward positions 118 and 119 when tilting frame assembly 30 has been raised by vertical sliding frame assembly 18 to its maximum vertical adjustment, shaper table 11 is provided with spaced slots 123 to afford clearance for the vertical side plates 31 and bearing plates 33 of the tilting frame assembly 30. Also, in order to provide access to and clearance for chuck 40 under conditions of high vertical adjustment of the sliding frame assembly 18 or spindle housing 36, or under certain conditions of forward angular tilt of the tilting frame assembly 30, or combinations of both, it becomes necessary to provide a U-shaped segment 124 which is adapted for removal to afford the necessary chuck 40, the chuck 40 being larger in diameter than the width of the slot in segment 124.

In accomplishing the various adjustments of tilting frame assembly 30 necessary to accommodate different sized cutters and workpieces of various dimensions, obviously consideration must be given to maintaining the operative association between tilt motor 100 and its related gear and drive system. It is important that proper tension be maintained in belt 108 which connects driving pulley 106 or tilt motor 100 and driven pulley 107 and proper tension in chain 112, which connects driving sprocket 110 and driven sprocket 111, for the reason that said sprockets 110 and 111 must remain in a constant, spaced relationship at all times (i. e., the distance from the center of driving sprocket 110 to the center of driven sprocket 111 must remain constant). In accomplishing this, as best shown in Figure 3, the reducer 105 is secured to a horizontally disposed flat plate 153, which in turn is slidably mounted on a horizontally disposed and rearwardly extending bracketed shelf 154 which is fixedly attached to the rear face of column 12. A conventional set of longitudinal ways 155 is preferably employed to provide the slidable mounting for reducer 105 and its plate 153, the inner longitudinal guides of the ways 155 (not shown) being attached to the underside of the flat plate 153, and the outer longitudinal guides thereof being attached to the upper surface of shelf 154. Through these means, it is apparent that the reducer 105 may be adjusted in a fore and aft direction.

An L-shaped angle bracket 156 is fixedly attached to the lower surface of plate 153 with its vertically disposed portion extending downwardly through a slot in shelf 154. A link or tie bar 157, which passes through a vertically slotted aperture in the rear face of column 12, is pivotally attached to the lower end of the angle bracket 156 and has a forward externally threaded end adapted to engage a turnbuckle 158. The forward end of turnbuckle 158 is adapted to engage the externally threaded aft end of a second link or tie bar 159, whose forward end is pivotally connected to the right-hand vertical side plate 19 of the vertical sliding frame assembly 18 by means of a pin and bracket arrangement (not shown), which fits within aperture 115 (Figure 2) in the side plate of column 12. Aperture 115 is of sufficient length to permit the sliding frame assembly 18 to be vertically adjusted within its limits with adequate clearance for said pin and bracket attachment for link 159. By rotating turnbuckle 158 to extend links 157 and 159, the drive chain 112 may be initially tensioned, a locknut 160 serving to lock turnbuckle 158 in adjusted position. The pivotal points of the links 157 and 159, and the centers of sprockets 111 and 110 respectively form a quadrilateral EFGH (Figure 3) which approximates a parallelogram. It is to be noted that none of the points E, F, G and H are permanently fixed, since points F and G are vertically adjustable, while points E and H are horizontally movable. However, the distances between points (EF, FG, GH and EH) remain substantially constant during all vertical adjustments of the sliding frame assembly 18. When the sliding frame assembly 18 is at its lowermost vertical adjustment, points F and G are respectively lower than points E and H. As the sliding frame assembly 18 is raised, thereby vertically raising points F and G, the linkage comprising links 157 and 159, and turnbuckle 158, moves from an angularly disposed position towards a horizontal position, moving plate 153 and reducer 105 aft, and thus maintaining distance GH constant. When point F is at the same height as point E, the reducer 105 is in its most rearward position. Further raising of the sliding frame assembly 18 (raising point F above point E) moves reducer 105 forward, at all times keeping distance GH constant so that there is no sag in drive chain 112. If no provision were made for adjustment of the position of reducer 105 the variation encountered in raising or lowering the sliding frame assembly 18, through small, would result in sufficient sag or slack in the drive chain 112, which would result in lost motion in the gear system, and further resulting in certain inaccuracies in the angle or degree of tilt of milling cutter 41.

Provision is also made for maintaining proper tension in driving belt 108 associated with tilt motor 100. As shown, tilt control motor 100 is fixedly attached to a horizontally disposed and rearwardly extending hinged plate 161 which is attached to a bracket 162 through a hinge fitting 163. Plate 161 is mounted in such a manner below shelf 154 that pulleys 106 and 107 are in alignment. Bracket 162 is fixedly attached to the rear face of column 12, and has at its lower end a bifurcated attachment 164 to accommodate an eye-bolt or T-bolt 165 which is pivotal in a vertical plane. The rearwardly disposed end of the T-bolt 165 is externally threaded and is adapted to pass through a vertically slotted aperture in the downwardly depending flange of an L-shaped angle bracket 166, which is fixedly attached to the underside of hinged plate 161. Locknuts 167 on the threaded portion of T-bolt 165 are employed to position the angle bracket 166 and lock it in place, one locknut 167 being located on each side of the downwardly depending flange. As the downwardly depending flange of angle bracket 166 is moved forward, the hinged plate 161 slopes downwardly, tightening belt 108. When the downwardly depending flange of angle bracket 166 is moved aft, hinged plate 161 slopes upwardly loosening the drive belt 108. Thus, through the means just described the proper tension in driving belt 108 may be readily effected.

There will now be described that portion of the gear system illustrated in Figure 5 which serves to control the fore and aft movement of the electronic tracing device 99 and also to indicate, to the machine operator, the angular tilt of the tilting frame assembly 30. As shown, a spur gear 125 which is keyed to the right-hand end of cylindrical shaft 113 has the external radial teeth thereof adapted to engage the gear teeth of a rack 126 which in turn is securely fastened to a spacer plate 127. The spacer plate 127 is in turn fixedly attached to an upwardly extending and vertically disposed link or bar 128. An upper rack 129, identical to rack 126, is fixedly attached to the upper end of bar 128. Bar 128 is free to move vertically in either direction, its movement being controlled by the engagement of spur gear 125 with rack 126. Bar 128 and racks 126 and 129 are retained in position (laterally and in a fore and aft sense) by flanged back-up rollers 130 and 131 which are preferably of the ball or roller-bearing type to reduce friction. The lower back-up roller 130 is supported by a gusseted bracket 132 which mounts on the inner (enclosed) surface of the left-hand (inner) side plate of the box-like column 12. Bracket 132 is quasi-Z-shaped, being offset to provide clearance for the driven sprocket 111. The upper back-up roller 131 is supported by an L-shaped angle bracket 133 which mounts on the front face of the right-hand vertical support member 15 of superstructure 13. In this manner, the link or bar 128 is restrained from any motion other than in a vertical sense.

The vertical movement afforded bar 128 is made to result in rotative movement of a spur gear 134, suitably located to engage with upper rack 129 of bar 128. Spur gear 134 has a bevel pinion 135 fixedly attached thereto, both being keyed to a common shaft 136. Bevel pinion 135 is adapted to engage a mating bevel gear 137 mounted on a cylindrical shaft 138, which shaft has keyed to its rearwardly disposed end a miter gear 139. Meshing with miter gear 139 is a second miter gear 139' which is keyed to the right-hand end of a cylindrical shaft 140. Shafts 136 and 140 are essentially parallel while shaft 138 is mutually perpendicular to shafts 136 and 140, the centerlines of shafts 136, 138 and 140 all lying substantially in the same horizontal plane. Cylindrical shafts 136, 138 and 140 have a common support afforded by a support fitting or bracket 141, the vertically disposed flanges 142 (Figure 3) of which are fixedly attached to the rear face of the horizontal box-like structure 20 of vertical sliding frame assembly 18. Thus, the entire gear system illustrated in Figure 5 is capable of moving vertically up or down with the vertical sliding frame assembly 18 as the latter is adjusted, since the supports for the gear system (journal box 114 and bracket 141) are fixedly attached to the sliding frame assembly 18.

The various angles of tilt assumed by the tilting frame assembly 30 are indicated by a semi-circular dial 143, suitably calibrated in degrees and having its geometric center coincidental with the centerline of shaft 138. Dial 143 is mounted at the forward end of said horizontally disposed cylindrical shaft 138 and is apertured to permit the passage of cylindrical shaft 138 therethrough. A bracket 144 (Figure 3), which is mounted on fitting 141, serves as support for the dial 143. A pointer or indicator 146, keyed to the forward end of cylindrical shaft 138 for common rotation therewith, serves to indicate to the machine operator the angle of tilt of the tilting frame assembly 30. It is evident that through a proper seelction of gear ratios shaft 138, which carries indicator 146, and tilting frame assembly 30 will have identical rates of rotation so that indicator 146 will provide a reading which corresponds to the angle of tilt which is assumed by the tilting frame assembly 30.

Next will be described the manner in which the movement of titling frame assembly 30 is made to correspond to the movement of the electronic tracing device 99. It is noted that the left-hand end of cylindrical shaft 140 has keyed or pinned thereto, in a conventional manner, a spur gear 147 (Figure 5), the external radial teeth of which are adapted to engage the mating teeth of a rack 148 which is fixedly attached to the upper portion of a T-shaped block 149. T-shaped block 149 is vertically disposed, as shown, being pinned through its vertical leg to the aft end of a forwardly extending and horizontally disposed cylindrical shaft 150 which fixedly carries the electronic tracing device 99 at its outer end and maintains device 99 spaced from rack 148. A bifurcated fitting 151, which is fixedly attached to the rear face of the rectangular box-like structure 20, is adapted to slidably support the T-shaped block 149, serving to maintain block 149 in its vertically disposed position. Shaft 150 passes through the rectangular box-like structure 20, and is freely slidably mounted in bushed collars 152 and 152', of the self lubricating type, which are in turn fixedly attached to the front and rear faces respectively, of box-like structure 20 of vertical slide frame assembly 18. Collars 152 and 152' serve primarily to maintain the cylindrical shaft 150 in a definite relationship to box-like structure 20, providing a close sliding fit for cylindrical shaft 150, so that shaft 150 is able to move only fore and aft, being constrained against lateral, vertical and rotational motion. The bushings also serve to minimize the effects of sliding friction when shaft 150 is moving fore or aft.

Thus, from the description hereinabove afforded of the apparatus illustrated in Figure 5, it is apparent that the pivotal movement of tilting frame assembly 30 and the fore and aft movement of the electronic tracing device 99 are correlated, and that the motivating force for effecting such movements is provided by a common source which is the tilt control motor 100. This correlation is such in the present invention that for each degree of pivotal movement of tilting frame assembly 18 there will be a displacement of 0.012" of the electronic tracing device 99. It is obvious, however, that the present invention is not restricted to the particular degree of movement or displacement described, but contemplates any suitable variations thereof, which will, of course, be dependent upon the particular driving means and gear ratios selected.

Electronic tracing device 99 is employed as the automatic controlling means for varying the angle or degree of tilt of cutter 41 of the present invention. It is to be understood, however, that the particular construction of device 99, in itself, forms no part of the present invention, but rather is one form of the various types of tracing devices which are commercially available and suitable for use with the present shaping machine. A tracing device generally of the type contemplated is shown and described in U. S. Patent No. 2,226,677. The preferred device 99 is of the auto-reflection pick-up type which emits a beam of light through a self-contained optical unit, and receives the reflected light from such beam in a sensitive internal phototube unit. The latter unit serves to transmit a signal which, after suitable amplification in amplifier 101 is channelled through a reversing switch unit 103 which controls the actuation of the tilt control motor 100 in a clockwise or a counterclockwise direction or which has no effect upon such motor, dependent upon the intensity of the reflected light received by the phototube unit of tracing device 99. Other forms of tracing devices are also satisfactory for use with the present invention so long as the form of tracing device utilized is capable of controlling the operation and direction of rotation of tilt control motor 100 in accordance with an electrical signal generated by virtue of the operative association of the tracing device with a guide or template.

In operation, a beam of light 168 is emitted through the lower end of device 99 to focus as a point of light on the surface of the template 97. In the present invention, as has been described, tracing device 99 remains in a relatively fixed location, being capable only of fore and aft motion, while the template 97 is moved transversely beneath it. In this manner, the light spot focused on the surface of the template 97 is caused to traverse the length thereof. Since it is the intensity of the reflected light which causes an electrical impulse or signal to be transmitted to the tilt control motor 100 as previously described, the surface of the template 97 upon which the light spot is focused must offer sufficient contrast. For this reason the upper surface of template 97 incorporates a painted color combination of a black area adjacent a white area, though, of course it is contemplated that any combination having sufficient contrast could be employed. In use with template 97, the light from device 99 normally will be focused half on the black area and half on the white area. This location of the beam of light constitutes its neutral or normal position, producing a reflected light of an average or intermediate intensity and no error signal will be transmitted from the electronic tracing device 99 to actuate the tilt control motor 100. Tilting frame assembly 30 will therefore remain stationary.

When the template 97 is moved so that the light spot is directed more onto the black than on the white area, light is then absorbed and the intensity of reflected light received by the phototubes of device 99 is reduced from its quiescent level. The error signal thereby developed serves to control actuation of the tilt control motor 100 and causes rotation of the tilting frame 30 and cutter 41. Since the movements of the tilting frame 30 and the tracing device 99 are correlated, as hereinbefore described, the pivotal movement of frame 30 will, through the gear system interconnecting it and the tracing device 99, effect a rectilinear movement of the tracing device 99 toward a position where the light beam is again focused half on the black area and half on the white area, at which time the tracing device 99 will cease to transmit an error signal to tilt control motor 100, and rotation of tilting frame assembly 30 will stop.

In the present embodiment when the light spot is focused more in the black area of template 97, tilting frame assembly 30 will be actuated for clockwise rotation (developing a closed angle); conversely, if the light spot is focused more in the white area of template 97, tilting frame assembly 30 will have a counterclockwise rotation (developing an open angle), as will be hereinafter further described. Conversely, if the light spot is directed more on the white background of the template 97 than on the black, more light will be reflected back to the phototubes, and the reflected light intensity will produce an error signal which differs from that produced when the light spot is on the black area. This signal causes the tilt control motor 100 to rotate in the opposite direction to that when the light spot is on a black area, effecting movement of cutter 41 in a corresponding direction, and simultaneously moving the electronic tracing device 99 back toward its neutral position relative to the black and white areas.

Figures 7, 8, 9, 10:
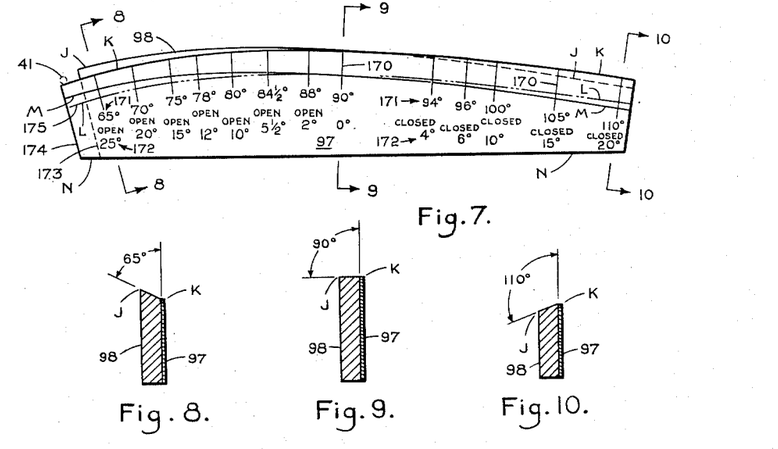
Figure 7 is a plan view of a typical form block with template attached thereto, and illustrating the varying or changing face angles between one end and the other.
Figure 8 is a sectional view of the form block and template shown in Figure 7, illustrating an open angle face, as taken at the line 8—8 in Figure 7.
Figure 9 is a sectional view of the form block and template shown in Figure 7, illustrating a right angle face, as taken along the line 9—9 of Figure 7.
Figure 10 is a sectional view of the form block and template shown in Figure 7, illustrating a closed angle face, as taken along the line 10—10 of Figure 7.

For the purpose of describing the operation of the present invention there is illustrated in Figure 7 a typical form block or workpiece 98 with a typical template 97 attached. Form block 98, shown in plan view in Figure 7 illustrates a workpiece which has been machined to provide thereon a face angle varying from "open" at the left end to "closed" at the right end. In traveling along the face of form block 98 during the cutting operation it is apparent that the angularity of the milling cutter 41 reversed once while shaping that particular side of form block 98. Various angles which were formed are illustrated in Figures 8, 9 and 10, Figure 8 illustrating an open angle of 65°, as taken along the line 8—8 in Figure 7; Figure 9 illustrating a 90° or right angle face, as taken along the line 9—9 in Figure 7; and Figure 10 illustrating a closed angle of 110°, as taken along the line 10—10 in Figure 7.

In Figure 7, the bottom edge of the face of form block 98 is represented by J—J, while the upper edge, as well as the edge of template 97, is represented by K—K; thus the variable angle face of the form block 98 is that area which is enclosed by lines J—J and K—K between the ends of said form block 98.

A reference line L—L, herein referred to as the median line, is shown on the upper surface of the template 97 in Figure 7. This median line L—L lies equidistant at all points from the upper edge K—K, being located at an arbitrary distance therefrom, line L—L serving to represent a 90° or right angle face on the edge of form block 98. At such time as the light spot is centrally focused on median line L—L the milling cutter 41 will be at that time precisely vertically disposed and adapted to mill a 90° face angle on form block 98.

A guide line M—M is provided on the template 97 and it is the path followed by the beam of light of tracing device 99 in effecting the desired angle of tilt of milling cutter 41. Line M—M may be a bright scribed line against a dark background, and having a width of less than 0.005" wide, but line M—M is desirably merely a line of demarcation on template 97 formed by and between a black area bounded by edge K—K and line M—M and a white area bounded by line M—M and edge N—N to thereby provide a guide line or track on the surface of template 97.

Since the gear system previously described moves the electronic tracing device 99 fore or aft 0.012" for every degree of clockwise or counterclockwise rotation of the tilting frame assembly 30 in the present embodiment of the invention, it is readily apparent that line M—M will be located at a distance of 0.012" above or below median line L—L for each degree of counterclockwise or clockwise rotation of said tilting frame assembly 30 which is desired. Thus, for a full 45° rotation of the tilting frame assembly 30 in either direction from vertical, line M—M will vary 0.54" (0.012×45=0.54) above or below median line L—L. Obviously, median line L—L is located from the edge K—K of template 97 a distance sufficient to permit the tracing of line M—M on template 97 for the most extreme face angle desired.

Since the preferred rate of rotation of the tilting frame assembly 30 is one degree per second, and since the electronic tracing device 99 moves fore or aft at a rate of 0.012" per second, it should be apparent that the maximum rate of feed of form block 98 with template 97 attached thereto, past cutter 41 should be slow enough that line M—M does not vary more than 0.012" in any one-second time interval.

To afford a visual check to the operator that the cutting operation is being properly performed, there is provided on the upper surface of template 97 a series of reference lines 170 having associated therewith indicia 171 representing the angular condition of the cutter 41, and indicia 172 representing the corresponding complementary angles, when cutter 41 is located at any particular reference line 170. By comparing the reading on dial 143 with the reading of indicia 172, the complementary angles, on template 97 at the instant that an indicating line 170 is in alignment with the center of cutter 41, an operator may readily ascertain if the form block 98 is being accurately shaped to the open or closed angle desired.

In the operation of cutting the varying face angle on a form block or workpiece 98, sliding frame assembly 18 is adjusted, up or down, until the top of milling cutter 41 is flush with or very slightly below the upper surface of form block 98. This locates the center of rotation or pivotal axis 35 at the upper edge K—K of form block 98. Assuming form block 98 to be one inch thick, pointer 27 will indicate "one inch" on graduated scale 26. The relationship between cutter 41 and guide pin 90 is then adjusted as previously described, and the form block 98 with template 97 attached thereto is then set in position on the shaper table 11. During the cutting operation, the edge K—K of template 97 must be held in contact with the lower portion of the beveled face of guide pin 90 and accordingly a prepositioning of cutter 41 is made to the face angle of the initial cut. Normal machine shop practice allows for excess material on the blank form block, and thus the edge to be shaped on form block 98 prior to the shaping operation usually extends sufficiently beyond the edge of template 97 to preclude contact of the edge K—K of template 97 with the beveled face of guide pin 90. This excess material may be almost negligible in some instances, such as when starting with a right angle or closed angle at the left end of form block 98, but the excess material is generally considerable when the cutting or milling operation is commenced with an open angle, as would be the case when starting at the left end of the form block 98 shown in Figure 7. The prepositioning of milling cutter 41 may be accomplished in any suitable manner, either automatically or manually.

To accomplish automatic pre-positioning of cutter 41, the left end 174 of template 97 is extended beyond the left end 173 of form block 98. Since the line M—M, on the present template 97, is located above median line L—L for an open angle, a positioning of electronic tracing device 99 rearwardly is necessary in order for the light spot to focus on line M—M. The rearward positioning of electronic tracing device 99, which causes tilting frame assembly 30 to rotate counterclockwise and pre-position milling cutter 41 for an open angle, is effected by the reflection of the light spot from the white background in the present invention. Thus, when the electronic tracing device 99 is set in operation, the light beam 168 is focused as a light spot on the white area at the left end of template 97, being initially located at 175 (Figure 7), centered on the imaginary median line L—L. Since the reflected light intensity will be above average, the tilt control motor 100 rotates the tilting frame assembly 30 in a counterclockwise direction, at the same time effecting simultaneous movement of the electronic tracing device 99 rearwardly. The blank form block 98 with template 97 attached is held in this position until the light spot is centered half on the black area and half on the white area (centered on line M—M) on the surface of the extended portion of template 97. At this time, the tilting frame assembly 30 ceases rotation and remains stationary, and the milling cutter 41 is properly pre-positioned. This pre-positioning of the milling cutter 41 precludes the possibility of too much material being removed from the bottom edge J—J of form block 98 at the beginning of the milling operation, which might otherwise happen if the milling operation were started prior to the milling cutter 41 being properly pre-positioned. After pre-positioning has been accomplished, the form block 98 may be fed past cutter 41, always, of course, maintaining edge K—K of template 97 in contact with the beveled face of guide pin 90.

If a template 97 were being employed which had its line M—M located equidistant from edge K—K of the template along its length, it is evident that the light spot of tracing device 99 would remain centered, half on the black area and half on the white background. When a centered condition exists, the reflected light, as described, remains constant at an average intensity and no error signal is transmitted to the tilt control motor 100. Therefore, a constant face angle would be milled on the form block 98 as the form block 98 is fed past the cutter 41. However, in the example illustrated by Figures 7 through 10, the relationship of line M—M to the edge K—K of template 97 is a varying one; that is, the line M—M is not equidistant therefrom, this, in order to effect a varying face angle, as heretofore described. As the form block or workpiece 98 is fed past the cutter 41 (from left to right on form block 98), the light spot tends to enter the black area since the distance between edge K—K and line M—M is increasing in the direction of feed. As more than half the spot of light will fall on the black area, the error signal transmitted to the tilt control motor 100 causes it to actuate the tilting frame assembly 30 in a clockwise direction increasing the angularity of the cutter 41. Simultaneously, with rotation of tilting frame assembly 30, the electronic tracing device 99 is displaced forwardly by the gear system until equilibrium has been restored, which occurs with the light spot becoming centered again, half on the black area and half on the white area, thereby nulling the signal and halting the operation of the tilt control motor 100. In this particular example (Figure 7), the face angle is constantly varying from "open" to "closed," at no time reversing direction so the light spot will always tend to enter the black area, following the curved line M—M evenly to produce a smoothly varying face angle. Therefore, the action described above is constantly recurring.

However, if a template were used wherein the distance between edge K—K and line M—M on template 97 were decreasing in the direction of feed, indicating a face angle varying from "closed" to "open," the light spot would tend to enter the white area on template 97. With more than half the light spot within the white area, the resultant signal to the tilt control motor 100 (produced by the increased light intensity) would cause the tilting frame assembly 30 to rotate in a counterclockwise direction, decreasing the angularity of the milling cutter 41. Electronic tracing device 99 would simultaneously be moved rearwardly until equilibrium were restored and the signal neutralized by the light spot again becoming centered on line M—M.

The angle of tilt of the tilting frame assembly 30 can be varied in extremely small increments when the line M—M varies as a faired and smoothly blended line. If the degree of curvature of line M—M varies suddenly and becomes greater, the rate of feed should be decreased to allow time for the tilting frame assembly 30 and cutter 41 to pivot to the angle adapted for cutting the suddenly increased face angle indicated by line M—M, and also to insure that contact is maintained between cutter 41 and the face of the form block or workpiece 98.

It is noted that the templates which are employed by the present invention serve a dual purpose, the edge K—K of a template serving as a profiling template in the conventional manner, and the line M—M thereof serving to control the angle of tilt of the milling cutter 41, as heretofore described.

It is to be understood that the angle or degree of tilt of the cutter 41 may also be automatically controlled by suitable electrical or electro-mechanical devices in lieu of electronic tracing device 99. Such devices would be appropriately mounted on the forward end of the cylindrical shaft 150, and would cooperate with the template 97 to develop suitable signals for controlled rotation of the tilt control motor 100. However, where a high degree of accuracy is required, the electronic tracing device 99 employed in the present embodiment of the invention is to be preferred since it is more sensitive and will more accurately follow the guidance of the template than either an electrical or electro-mechanical tracing device.

The present invention exemplifies improvements in a conventional shaping machine of the shaper or router type which is adapted to automatically mill variable face angles on form blocks or workpieces with a high degree of accuracy. With the utilization of a fully automatic control means, such as the electronic tracing device and template described herein, the angle of tilt of a cutting tool may be varied gradually in a continuous cutting operation, thereby imperceptibly blending the varying face angles on a form block or workpiece and eliminating the excessive amount of handwork which has heretofore been required due to "step machining" operations previously employed.

While certain preferred embodiments of the invention have been specifically disclosed, it is understood that the invention is not limited thereto as many variations will be readily apparent to those skilled in the art and the invention is to be given its broadest possible interpretation within the terms of the following claims.

What I claim is:

1. A machine for shaping a varying angle edge face on a workpiece, said machine comprising a tiltable cutter, means for supporting said cutter for tilting movement about a fixed center having a locus at the side of the cutter facing the workpiece, a template supported on the workpiece and embodying a guide of varying contour, and means coupling said guide and said means for supporting said cutter for automatically tilting said cutter in response to and in accordance with the varying contour of said guide of said template to thereby shape a corresponding varying angle edge face on the workpiece.

2. A machine for shaping a varying angle edge face on a workpiece, said machine comprising a tiltable cutter, an assembly supporting said cutter for common movement therewith and arranged for tiltable movement about a fixed axis of tilt tangent to said cutter, means for vertically adjusting said assembly for accommodating workpieces of various thicknesses, a template supported on the workpiece and embodying a guide of varying contour, and means for automatically tilting said assembly and said cutter in response to and in accordance with the varying contour of said guide of said template to thereby enable shaping by said cutter of a corresponding varying angle edge face on the workpiece.

3. A machine for shaping a varying angle edge face on a workpiece, said machine comprising a cutter, mounting means for said cutter, an assembly arranged for tiltable movement about a fixed axis of tilt tangent to said cutter, means for supporting said mounting means on said assembly for vertical and lateral adjustment relative thereto, means for vertically adjusting said assembly, a template supported on the workpiece and embodying a guide of varying contour, and means for automatically tilting said assembly and said cutter in response to and in accordance with the varying contour of said guide of said template to thereby enable shaping by said cutter of a corresponding varying angle edge face on the workpiece.

4. A machine for shaping a varying angle edge face on a workpiece, said machine comprising a tiltable cutter, means for supporting said cutter for tilting movement about a fixed center having a locus at the side of the cutter facing the workpiece, a template supported on the workpiece and embodying a guide of varying contour, and means for automatically tilting said cutter in response to and in accordance with the varying contour of said guide of said template to thereby shape a corresponding varying angle edge face on the workpiece, said last mentioned means including means restrained to a rectilinear movement for tracing the varying contour of said guide and means for effecting rectilinear movement of said tracing means.

5. A machine for shaping a varying angle edge face on a workpiece, said machine comprising a cutter, mounting means for said cutter, an assembly arranged for tiltable movement about a fixed axis of tilt tangent to said cutter, means for supporting said mounting means on said assembly for vertical and lateral adjustment relative thereto, means for vertically adjusting said assembly, a template supported on the workpiece and embodying a guide of varying contour, and means for automatically tilting said assembly and said cutter in response to and in accordance with the varying contour of said guide of said template to thereby enable shaping by said cutter of a corresponding varying angle edge face on the workpiece, said last mentioned means including means restrained to a rectilinear movement for tracing the varying contour of said guide and means for effecting rectilinear movement of said tracing means.

6. A machine for shaping a varying angle edge face on a workpiece, said machine comprising a tiltable cutter, an assembly supporting said cutter for common movement therewith and arranged for tiltable movement about a fixed axis of tilt which is tangent to said cutter, tracing means supported for rectilinear movement for tracing the varying contour of a guide provided on a template carried by said workpiece, and means interconnecting said assembly and said tracing means for effecting tiltable movement of said assembly in response to said guide and simultaneously with rectilinear movement of said tracing device.

7. A machine for shaping a varying angle edge face on a workpiece, said machine comprising a tiltable cutter, an assembly supporting said cutter for common movement therewith and arranged for tiltable movement about a fixed axis of tilt which is tangent to said cutter, a template supported on the workpiece and embodying a guide of varying contour, tracing means supported for rectilinear movement for tracing the varying contour of said guide, means interconnecting said assembly and said tracing means for effecting tiltable movement of said assembly simultaneously with rectilinear movement of said tracing device, said tiltable movement and said rectilinear movement being in increments having a predetermined relationship one to the other, and means for continuously indicating the angle of tilt of said cutter throughout the shaping operation.

8. A machine for shaping a varying angle edge face on a workpiece, said machine comprising a tiltable cutter, means for supporting said cutter for tilting movement about a fixed center having a locus at the side of the cutter facing the workpiece, a template supported on the workpiece and embodying a guide of varying contour, and means for automatically tilting said cutter to shape a varying angle edge face on the workpiece, said last mentioned means including motive means having operative connection with said cutter, and tracing means cooperating with the varying contour of said guide of said template to transmit electrical signals to said motive means to vary the angle of tilt of said cutter.

9. A machine for shaping edge surfaces of workpieces into a variant contour and with a varying angle profile, said machine comprising supporting structure, a cutting tool, a movable assembly carrying said cutting tool for common movement therewith, said assembly being mounted upon said supporting structure and tiltable thereon about a fixed axis which is tangent to said cutting tool, motive means operatively connected to said assembly for causing tilting movement thereof, a locating member and a tracer carried by said supporting structure adapted to cooperate with a template having first and second guide tracks of variant contour and movable with a workpiece, said locating member and said tracer acting with said first and second guide tracks to determine, respectively, the contour of the cut in the workpiece and the varying angle profile of such cut.

10. A machine for shaping edge surfaces of a workpiece into a variant contour and with a varying angle profile, said machine comprising a frame, a table carried by said frame for supporting a workpiece, structure mounted on said frame and adapted for slidable movement to adjusted positions along a first axis, a cutting tool, an assembly carrying said cutting tool for common movement therewith, said assembly being mounted upon said structure and tiltable thereon about a second axis substantially perpendicular to said first axis, and tangent to said cutting tool at the upper forward edge thereof, motive means having an operative connection with said assembly for effecting tilting movement thereof, a locating member normally fixedly mounted on said structure, and tracing means supported for rectilinear movement on said structure, said locating member and said tracing means adapted to cooperate with a template supported on a workpiece and embodying first and second guide tracks of variant contour, said locating member acting with said first guide track to determine the contour of the cut in the workpiece, and said tracing means acting with said second guide track to effect directional actuation of said motive means to tilt said assembly and cutting tool in accordance with the contour of said second guide track to shape a varying angle profile on the workpiece.

References Cited in the file of this patent

UNITED STATES PATENTS

| 1,237,487 | Dickie | Aug. 21, 1917 |
| 1,293,956 | Sloan | Feb. 11, 1919 |
| 2,323,587 | Duffy | July 6, 1943 |
| 2,669,908 | Buechler | Feb. 23, 1954 |
| 2,674,160 | Martellotti | Apr. 6, 1954 |

FOREIGN PATENTS

| 696,653 | Germany | Sept. 26, 1940 |